(12) United States Patent
Matthies

(10) Patent No.: US 11,487,261 B2
(45) Date of Patent: Nov. 1, 2022

(54) AUTOMATION DEVICE

(71) Applicant: Phoenix Contact GmbH & Co. KG, Blomberg (DE)

(72) Inventor: Thorsten Matthies, Barntrup (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 1127 days.

(21) Appl. No.: 16/074,325

(22) PCT Filed: Dec. 16, 2016

(86) PCT No.: PCT/EP2016/081487
§ 371 (c)(1),
(2) Date: Jul. 31, 2018

(87) PCT Pub. No.: WO2017/133821
PCT Pub. Date: Aug. 10, 2017

(65) Prior Publication Data
US 2021/0191355 A1    Jun. 24, 2021

(30) Foreign Application Priority Data
Feb. 2, 2016    (DE) ...................... 10 2016 101 767.1

(51) Int. Cl.
G05B 19/042    (2006.01)
G08B 5/38    (2006.01)
H04B 10/116    (2013.01)

(52) U.S. Cl.
CPC ........... *G05B 19/0425* (2013.01); *G08B 5/38* (2013.01); *H04B 10/116* (2013.01); *G05B 2219/23161* (2013.01); *G05B 2219/23172* (2013.01); *G05B 2219/24001* (2013.01); *G05B 2219/24048* (2013.01)

(58) Field of Classification Search
None
See application file for complete search history.

(56) References Cited

U.S. PATENT DOCUMENTS 9,105,430 B1 *    8/2015    Morales .................. F24F 5/0003
9,588,506 B1 *    3/2017    Clayton .................. G05B 15/02
10,101,586 B2 *   10/2018   Fujimaki ............ G02B 27/0172
10,161,674 B2 *   12/2018   Takaki .................. H04L 12/282
(Continued)

FOREIGN PATENT DOCUMENTS

CN    1561510 A    1/2005
DE    3304052 A1   9/1983
(Continued)

*Primary Examiner* — Philip Wang
*Assistant Examiner* — Rongfa P Wang
(74) *Attorney, Agent, or Firm* — Holland & Hart LLP

(57) ABSTRACT

The disclosure relates to an automation device of a group of automation devices, comprising: a communication interface configured to communicate with a second automation device of the group of automation devices via a communication network; wherein the communication interface is configured to receive a status message of the second automation device that indicates a state or a change in state of the second automation device; and a light source configured to emit a light signal indicating the state or the change in state of the second automation device in response to the receiving of the status message.

17 Claims, 3 Drawing Sheets

(56) References Cited

U.S. PATENT DOCUMENTS

| | | | |
|---|---|---|---|
| 11,282,303 B2* | 3/2022 | Roth | G06V 20/582 |
| 2004/0260518 A1* | 12/2004 | Polz | G05B 19/0423 |
| | | | 710/73 |
| 2007/0005555 A1* | 1/2007 | Jain | G06F 16/188 |
| 2015/0142138 A1 | 5/2015 | Mohan et al. | |
| 2015/0177718 A1* | 6/2015 | Vartiainen | G05B 15/02 |
| | | | 700/83 |
| 2016/0071378 A1* | 3/2016 | Mokubo | G08B 5/24 |
| | | | 340/691.6 |
| 2016/0119060 A1* | 4/2016 | Byers | H04L 1/0002 |
| | | | 398/118 |
| 2016/0209731 A1* | 7/2016 | Song | G03B 17/06 |
| 2017/0094437 A1* | 3/2017 | Kadri | H04S 7/301 |
| 2017/0229680 A1* | 8/2017 | Nanno | H01L 27/3206 |
| 2018/0268458 A1* | 9/2018 | Popa | G06Q 30/02 |
| 2021/0272424 A1* | 9/2021 | Trudnak | G08B 21/182 |

FOREIGN PATENT DOCUMENTS

| | | |
|---|---|---|
| DE | 10121729 A1 | 12/2002 |
| DE | 201 22 094 U1 | 5/2004 |
| DE | 20 2011 107 014 U1 | 2/2012 |
| DE | 10 2012 223249 A1 | 6/2014 |
| JP | H0526555 A | 2/1993 |
| JP | H05 67020 U | 9/1993 |
| JP | 2002330229 A | 11/2002 |
| JP | 2003162626 A | 6/2003 |
| JP | 2004139329 A | 5/2004 |
| JP | 2004 328325 A | 11/2004 |
| JP | 2006004035 A | 1/2006 |
| JP | 2009 109740 A | 5/2009 |
| JP | 2012-026642 A | 2/2012 |
| JP | 2012251883 A | 12/2012 |
| JP | 2013162314 A | 8/2013 |
| JP | 2014-044001 A | 3/2014 |
| JP | 2014085803 A | 5/2014 |
| WO | WO2015/083653 A1 | 6/2015 |

* cited by examiner

US 11,487,261 B2

AUTOMATION DEVICE

CROSS-REFERENCE TO RELATED APPLICATIONS

This application is a 371 national phase filing of international Application No. PCT/EP2016/081487, entitled "AUTOMATION DEVICE", filed 16 Dec. 2016, which claims priority to German Patent Application No. 10 2016 101 767.1, entitled "AUTOMATISIERUNGSGERÄT", filed 2 Feb. 2016.

BACKGROUND

The present disclosure relates to an automation device of a group of automation devices.

The status of machines such as automation devices can be indicated and/or signaled in the form of optical and/or acoustic signals by signal towers mounted on the machines. However, visually and/or acoustically monitoring machine states can be hindered or infeasible due to a great distance from or a limited or obstructed view of the signal towers or due to a loud surrounding environment. Furthermore, visual and/or acoustic monitoring of machine states can also be hindered or infeasible due to the number of machines to be monitored.

Machines such as automation devices can furthermore have machine lights which can be used both for signaling the states of the machines as well as for illuminating the machines.

Printed publication DE 10 2013 102 644 A1 describes a particularly advantageous lighting device, in particular an LED machine light, for illumination in or on a machine. A control device thereby transmits a control signal to the lighting device for controlling a lighting property of a light source of the lighting device. Further described is looping a control signal of the control device through the lighting device to a further lighting device.

SUMMARY

The task underlying the disclosure is to provide an efficient concept for displaying a state or a change in state of an automation device in a group of automation devices.

This task is solved by the subject matter comprising the features according to the independent claims. Advantageous examples of the disclosure are the subject matter of the figures, the description and the dependent claims.

The present disclosure is based on the realization that the above task can be solved by an automation device of a group of automation devices which comprises a communication interface for receiving a status message of a further automation device of the group of automation devices, wherein the status message indicates a state or a change in state of the further automation device. The automation device further comprises a light source for emitting a light signal which indicates the state or the change in state of the further automation device.

According to a first aspect, the disclosure relates to an automation device of a group of automation devices which comprises a communication interface for communicating with a further automation device of the group of automation devices via a communication network, wherein the communication interface is configured to receive a status message of the further automation device indicating a state or a change in state of the further automation device, and a light source which is configured to emit a light signal indicating the state or the change in state of the further automation device in response to the receiving of the status message. This thereby achieves the advantage that the automation device can efficiently indicate the state or the change in state of the further automation device. A user operating or maintaining the automation device can in this way be informed about the state of further automation devices of the group of automation devices without the need to individually examine and/or observe the further automation devices. This can result in saving a considerable amount of time when determining states or changes in state of the automation devices in the group of automation devices.

The automation device and the further automation device can be machines of a group of machines. The group of automation devices can be an arrangement of the automation devices, whereby the automation devices of the arrangement can be disposed in a common location, e.g. a manufacturing site or production facility. The automation device and the further automation device can be alike, in particular exhibiting the same components and features.

The status message can indicate a state or a status of the further automation device, in particular a malfunctioning state or malfunctioning status of the further automation device, or a change in state or status of the further automation device. The state can be an error of the further automation device for example an unplanned process termination. The status message can be an error message or a warning message.

According to one example, the communication interface or a controller of the automation device is configured to detect a characteristic of the status message which indicates a type and/or a priority of the state and/or the change in state.

The characteristic of the status message can comprise a device ID and/or a location of the further automation device and/or an error type and/or an error code. The characteristic can further comprise a prioritization of the status message, e.g. high priority, medium priority or low priority.

According to one example, the light source is configured to emit the light signal in one light color and/or brightness and/or frequency, whereby the light color and/or brightness and/or frequency of the light signal is associated with the state, the change in state and/or the characteristic of the status message. This thereby achieves the advantage of a user being able to efficiently differentiate between different states and/or changes in state on the basis of the light color and/or brightness and/or frequency.

According to one example, the communication interface is configured to receive a further status message from a further automation device of the group of automation devices over the communication network and detect a characteristic of the further status message, wherein the further status message indicates a further state or a further change in state of the further automation device, and wherein the characteristic of the further status message indicates a type and/or a priority of the further state and/or the further change in state. This thereby achieves the advantage of a user being able to be informed about a further state or a further change in state of a further automation device of the group of automation devices without the need to examine and/or observe the further automation device. A controller of the communication interface can be configured to detect the characteristic of the further status message.

According to one example, the communication interface is configured to compare the characteristic of the status message and the characteristic of the further status message and detect a ranking of the status messages based on the respective characteristics, wherein the light source is configured to emit the light signal which indicates the state or the change in state denoted by the status message as being of higher priority. This thereby achieves the advantage of being able to efficiently display to a user the status message having the highest priority. The user can thus remedy the cause of an error message before the cause of a warning message having lower priority than the error message. The status messages can be ordered by descending priority ranking, wherein the status message having the highest priority takes the highest rank in the ranking. The controller of the communication interface can further be configured to compare the characteristic of the status message and the characteristic of the further status message and detect a ranking of the status messages based on the respective characteristics. The controller can further control the light source for emitting the light signal.

According to one example, the light source comprises at least one LED. The at least one LED can be configured to display the light signal in the red, yellow, blue or white colors of light.

According to one example, the light source is arranged in an interior space of the automation device. The light source can be a device and/or interior machine light.

According to one example, the communication interface is a wireless communication interface, in particular a WLAN communication interface, a Bluetooth communication interface, a ZigBee communication interface or a Trusted Wireless communication interface, or a wired communication interface, in particular a field bus communication interface, an Ethernet communication interface or a USB communication interface.

According to one example, the automation device comprises a detection device, wherein the detection device is configured to detect a maintaining or operating of the automation device by a user.

The detection device can be a switch, in particular a pushbutton. The detection device can be coupled to a service flap of the automation device and detect an opening of the service flap. The detection device can further be coupled in terms of communication exchange to a further communication interface of the automation device, for example a communication interface for the connecting of maintenance equipment, and/or to an input device of the automation device, for example a touchscreen.

The light source can be configured to display the light signal in response to the status message being received when the detection device detects a user's maintaining or operating of the automation device.

According to one example, the communication interface is configured to transmit a status message to the further automation device when the detection device detects the maintaining or operating of the automation device. The status message can indicate a maintaining or operating of the automation device. This thereby achieves the advantage that the automation device can efficiently communicate its maintenance state to the further automation device. The further automation device can thereupon forward the status message to the automation device, for example to inform the user who is maintaining or operating the automation device about the state of the further automation device.

According to one example, the automation device comprises a controller which is configured to determine a state or a change in state of the automation device. This thereby achieves the advantage of being able to efficiently detect the state or the change in state of the automation device. The controller can be a processor or can comprise a processor. The controller can further be configured to control, in particular actuate, the communication interface and/or the light source. The controller can comprise the aforementioned controller of the automation device.

According to one example, the light source is configured to emit a further light signal in response to the detecting of the state or the change in state of the automation device, wherein the further light signal indicates the state or the change in state of the automation device. This thereby achieves the advantage of the light source being able to efficiently indicate the state or the change in state of the automation device.

According to one example, the communication interface is configured to receive a further status message of the further automation device, wherein the further status message indicates a maintaining or operating of the further automation device by the user. The communication interface can be configured to transmit a status message to the further automation device upon the detecting of the state or the change in state of the automation device upon the presence of the further status message of the further automation device, wherein the status message indicates the state or the change in state of the automation device.

According to one example, the communication interface is configured to transmit a device status message to a communication device, particularly a mobile communication device such as a smartphone or a laptop, upon the detecting of the state or the change in state of the automation device. This thereby achieves the advantage of the communication device being able to efficiently indicate the state or the change in state. A user can thus be informed about the state or the change in state of the automation device while not in the process of operating or maintaining an automation device of the group of automation devices.

According to a second aspect, the disclosure relates to an arrangement of automation devices in a group of automation devices comprising a first automation device and a second automation device, wherein the second automation device is configured to transmit a status message and wherein the first automation device is configured to receive the status message of the second automation device and visually display a state or change in state of the second automation device as indicated by the status message received. This thereby achieves the advantage of the state or the change in state of the second automation device being able to be efficiently indicated by the first automation device.

According to a third aspect, the disclosure relates to a method for indicating states or changes in states of automation devices in a group of automation devices comprising a first automation device and a second automation device, comprising: transmitting a status message of the second automation device via the second automation device to the first automation device, receiving the status message of the second automation device by the first automation device, and optically displaying a state or change in state of the second automation device as indicated by the status message received by the first automation device. This thereby achieves the advantage that the state or the change in state of the second automation device can be efficiently indicated by the first automation device.

BRIEF DESCRIPTION OF THE DRAWINGS

Examples of the present disclosure are depicted in the drawings and will be described in more detail in the following.

DETAILED DESCRIPTION

Figure 1:
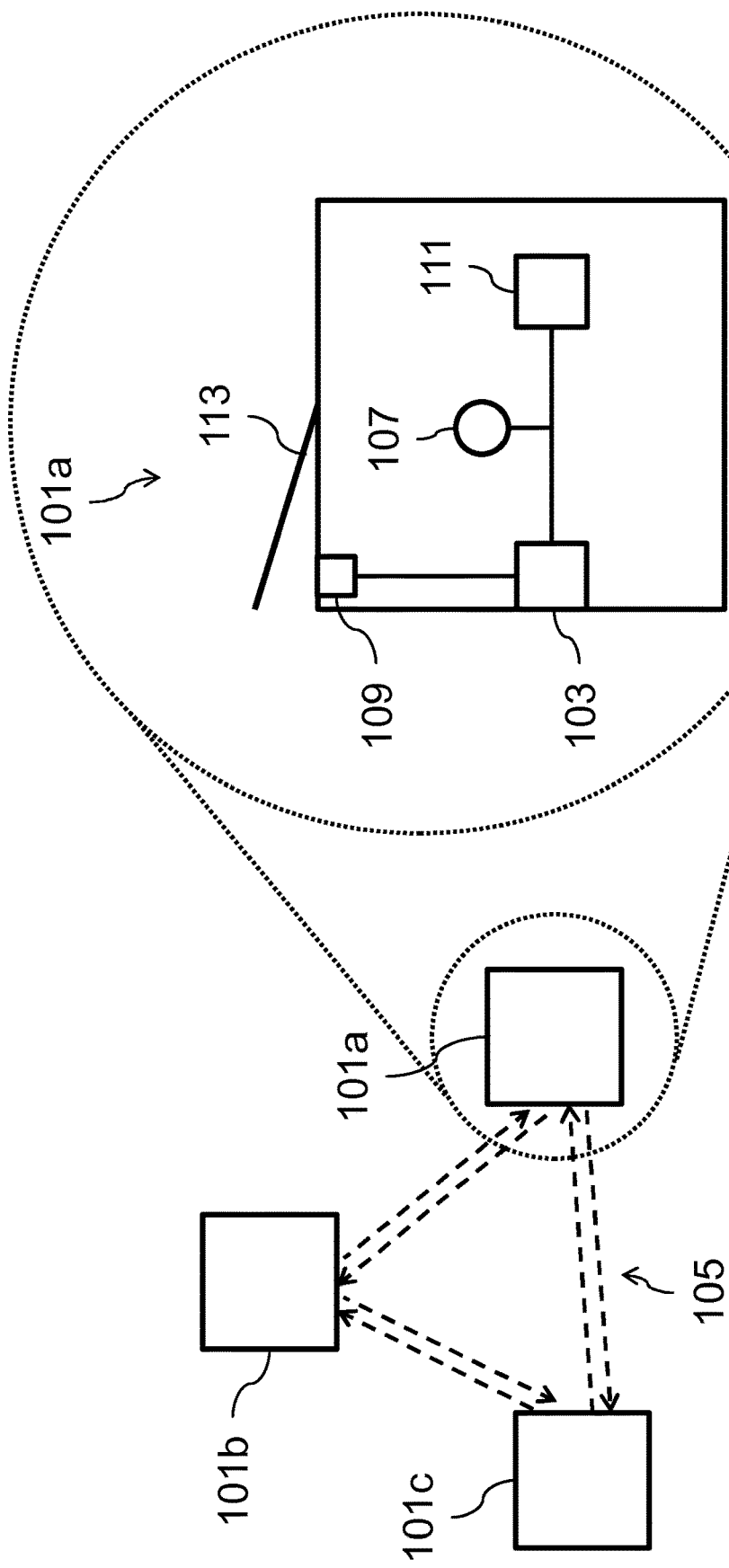
FIG. 1 shows a schematic diagram of an automation device of a group of automation devices.

FIG. 1 shows a schematic diagram of an automation device 101a of a group of automation devices 101a-c according to one example.

The automation device 101a comprises a communication interface 103 for communicating with a further automation device 101b-c in the group of automation devices 101a-c via a communication network 105, wherein the communication interface 103 is configured to receive a status message of the further automation device 101b-c which indicates a state or a change in state of the further automation device 101b-c, and a light source 107 which is configured to emit a light signal indicating the state or the change in state of the further automation device 101b-c in response to the receiving of the status message.

The group of automation devices 101a-c in FIG. 1 comprises the automation device 101a and two further automation devices 101b-c.

The automation device 101a and the further automation device 101b-c can be machines in a machinery group. The group of automation devices 101a-c can be an arrangement of automation devices 101a-c, wherein the automation devices 101a-c of the arrangement can be disposed in a common location, for example a manufacturing site or production facility. The automation device 101a and the further automation device 101b-c can be alike, in particular exhibiting the same components and features.

The status message can indicate a state or status of the further automation device 101b-c, in particular a malfunctioning state or malfunctioning status of the further automation device 101b-c, or a change in state or status of the further automation device 101b-c. The state can be an error of the further automation device 101b-c, for example an unplanned process termination. In this case, the status message can be an error message or a warning message.

The light source 107 can be a machine light. Furthermore, the light source 107 can be configured as a signal tower of the automation device 101a or can be integrated into a signal tower of the automation device 101a.

The communication interface 103 can be a wireless or wired communication interface. The communication interface 103 can comprise one of the following communication interfaces: WLAN communication interface, Bluetooth communication interface, ZigBee communication interface, Trusted Wireless communication interface, field bus communication interface, Ethernet communication interface, USB communication interface.

According to one example, the communication interface 103 is configured to detect a characteristic of the status message. The characteristic of the status message can indicate a type and/or a priority of the state and/or the change in state.

The communication interface 103 can be further configured to detect a further status message as well as a characteristic of the further status message. The further status message can indicate a further state and/or a further change in state of a further automation device 101b-c in the group of automation devices 101a-c. The characteristic of the further status message can indicate a type and/or a priority of the further state and/or the further change in state.

The status message and/or the further status message can be in the form of a broadcast telegram and received by the communication interface 103. The communication network 105 can form a broadcast domain for the status messages of the automation devices 101a-c.

The characteristic of the status message or respectively the characteristic of the further status message can comprise a device ID and/or the location of the further automation device 101b-c and/or an error type and/or an error code. The characteristic of the status message or respectively the characteristic of the further status message can further comprise a prioritization of the status message or the further status message respectively, e.g. high priority, medium priority or low priority.

The communication network 105 can be a wireless or a wired communication network. The communication network 105 can be a local network or a global network, particularly the internet.

The light source 107 can be an LED or at least comprise an LED. The light source 107 can be a machine light, in particular an LED machine light. Furthermore, the light source 107 can be configured as a signal tower of the automation device 101a or can be integrated into a signal tower of the automation device 101a. The light source 107 can furthermore be a device or interior machine light arranged in an interior space of the automation device 101a.

According to one example, the light source 107 is configured to emit the light signal in one light color and/or one light frequency. The light source 107 can thereby generate different types of signals based on the light frequency, in particular a steady light, a blinking light or a flashing light. The light source 107 can be further configured to emit the light signal at a specific brightness.

The light source 107 can further comprise a wired and/or a wireless power supply as well as a wired and/or a wireless interface. The interface can receive and/or evaluate information for selecting of the light color, the brightness or the signal type.

The light source 107, in particular the interface of the light source 107, can comprise a 5-pin M12 connector, the five contacts of which are assigned for example as follows:

| M12 connector | Assignment |
| --- | --- |
| Pin 1 | 24 V DC supply voltage |
| Pin 2 | Bit 1 for light color selection |
| Pin 3 | Common ground for the supply voltage and the signals at contacts 2 and 4 |
| Pin 4 | Bit 0 for light color selection |
| Pin 5 | Functional earth (FE) |

The Bit 0 and 1 combinations for the light color selection can be as follows:

| Bit 1 | Bit 0 | Assignment |
| --- | --- | --- |
| 0 | 0 | Light color: white |
| 0 | 1 | Light color: red |
| 1 | 0 | Light color: yellow |
| 1 | 1 | Light color: blue |

The light color and/or the light frequency and/or brightness of the light signal can be associated with the characteristic of the status message and/or the state and/or the change in state, or respectively the characteristic of the further status message and/or the further state and/or further change in state. In order to determine which status message should receive a higher priority upon displaying by the light source 107, the communication interface 103 and/or a controller 111 of the automation device 11a can be configured to compare the characteristic of the status message and the characteristic of the further status message and detect a ranking of the status messages based on the respective characteristics. The light source 107 can be configured to emit the light signal indicating the state or the change in state as indicated by the status message of higher priority ranking based on the ranking of the status messages. The controller 111 can thereby actuate the light source to emit the light signal.

If the communication interface 103 and/or the controller 111 identifies the same priority ranking for the status message and the further status message, the light source 107 can be configured to emit that light signal which is associated with the first of the given status messages. The controller 111 can thereby actuate the light source to emit the light signal. Thus, states of automation devices 101a-c which have already been pending for longer periods of time can be prioritized for display. If the first of the given status messages is no longer being received, for example due to the cause for a warning or error in an automation device 101a-c being resolved, the light source 107 can then be configured to emit that light signal which is associated with the previously not indicated status message, should same still be pending.

The automation device 101a in FIG. 1 further comprises a detection device 109.

The detection device 109 can be configured to detect a maintaining or an operating of the automation device 101a by a user, in particular a machine operator or supervisor. The maintaining or operating of the automation device 101a can comprise monitoring, setting up, maintaining or troubleshooting activities performed by the user.

The detection device 109 can be connected to an input device, for example a touchscreen, of the automation device 101a, and can detect the user operating the input device. The detection device 109 can furthermore be connected to a further communication interface of the automation device 101a for communication exchange, for example a communication interface for connecting maintenance equipment, and detect the connecting of such maintenance equipment. The communication interface 103 and the further communication interface can be the same.

The automation device 101a in FIG. 1 further comprises a service flap 113. The service flap 113 can be a flap or a window over a housing opening of the automation device 101a.

The detection device 109 can be connected to the service flap 113 and detect a user opening the service flap 113. This for example allows detecting whether maintenance has been performed on the automation device 101a. The detection device 109 can be a switch, in particular a pushbutton, able to detect when the service flap 113 is opened.

The automation device 101a in FIG. 1 furthermore comprises a controller 111. The controller 111 can be configured to detect a state or a change in state of the automation device 101a. The controller 111 can further be configured to control, in particular actuate, the communication interface 103 and/or the light source 107. The controller 111 can comprise the aforementioned controller 111 of the automation device 101a.

The controller 111 can be a processor or respectively microprocessor, or can comprise a processor or microprocessor respectively. The controller 111 can comprise a memory. Furthermore, the controller 11 can be integrated into a data processor connected to the automation device 101a, for example a desktop computer, a laptop or PLC.

The detection device 109 can comprise the controller 111.

The state of the automation device 101a can be an error of the automation device 101a, for example an unplanned process termination. The change in state of the automation device 101a can indicate a change in status of the automation device 101a, for example a process termination or a process completion.

According to one example, the light source 107 is configured to emit a further light signal in response to the state or change in state of the automation device 101a being detected, wherein the further light signal indicates the state or change in state of the automation device 101a.

Since the automation devices 101a-c of the group of automation devices 101a-c can be the same, each further automation device 101b-c can also be configured to display a status message of the automation device 101a comprising a respective light source 107 so as to indicate the state or the change in state of the automation device 101a.

For this purpose, the further automation device 101b-c can transmit a further status message to the automation device 101a during maintaining or operating by the user. The communication interface 103 of the automation device 101a can be configured to transmit a status message to the further automation device 101b-c upon the state or the change in state of the automation device 101a, should the further status message of the further automation device 101b-c be indicated, wherein the status message indicates the state or the change in state of the automation device 101a.

In this way, each automation device 101a-c of the group of automation devices 101a-c can indicate a status message of another automation device 101a-c of the group of automation devices 101a-c.

According to one example, each automation device 101a-c of the group of automation devices 101a-c comprises a machine controller. The machine controller can be configured for the wired or wireless controlling of the light sources 107 of the automation devices 101a-c. Furthermore, the automation devices 101a-c can be aggregated into the group by or respectively in the machine controller of the automation devices 101a-c within the respective group. The machine controller of each automation device 101a-c can be a programmable logic controller (PLC).

According to one example, the machine controller comprises the communication interface 103 and/or the detection device 109 and/or the controller 111 and/or the 5-pin M12 connector.

Figure 2:
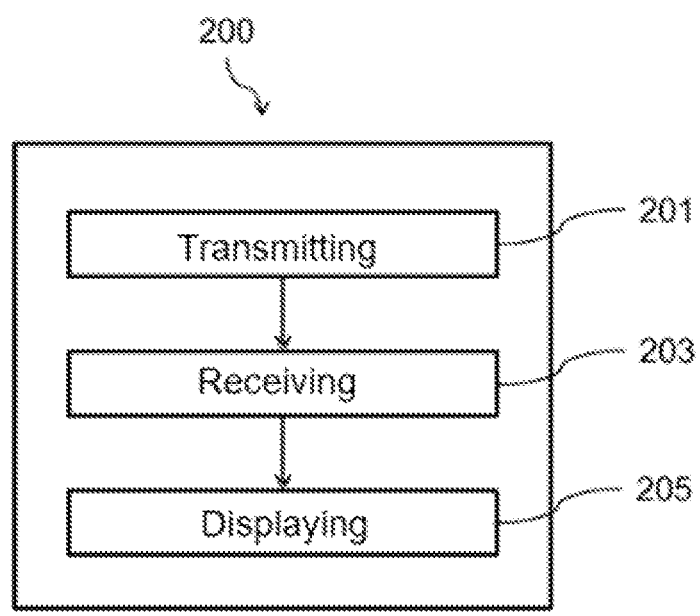
FIG. 2 shows a flow chart of a method for displaying states or changes in states of automation devices.

FIG. 2 shows a flow chart of a method 200 for displaying states or changes in state of automation devices 101a-c in the group of automation devices 101a-c according to one example, wherein the group of automation devices 101a-c comprises a first automation device and a second automation device.

The first automation device can correspond to the automation device 101a and the second automation device can correspond to a further automation device 101b-c in FIG. 1.

The method 200 comprises transmitting 201 a status message of said second automation device 101b-c to the first automation device 101a by the second automation device 101b-c, receiving 203 the status message of the second automation device 101b-c by the first automation device 101a, and optically displaying 205 a state or a change in state of the second automation device 101b-c as indicated by the status message received by the first automation device 101a.

Figure 3:
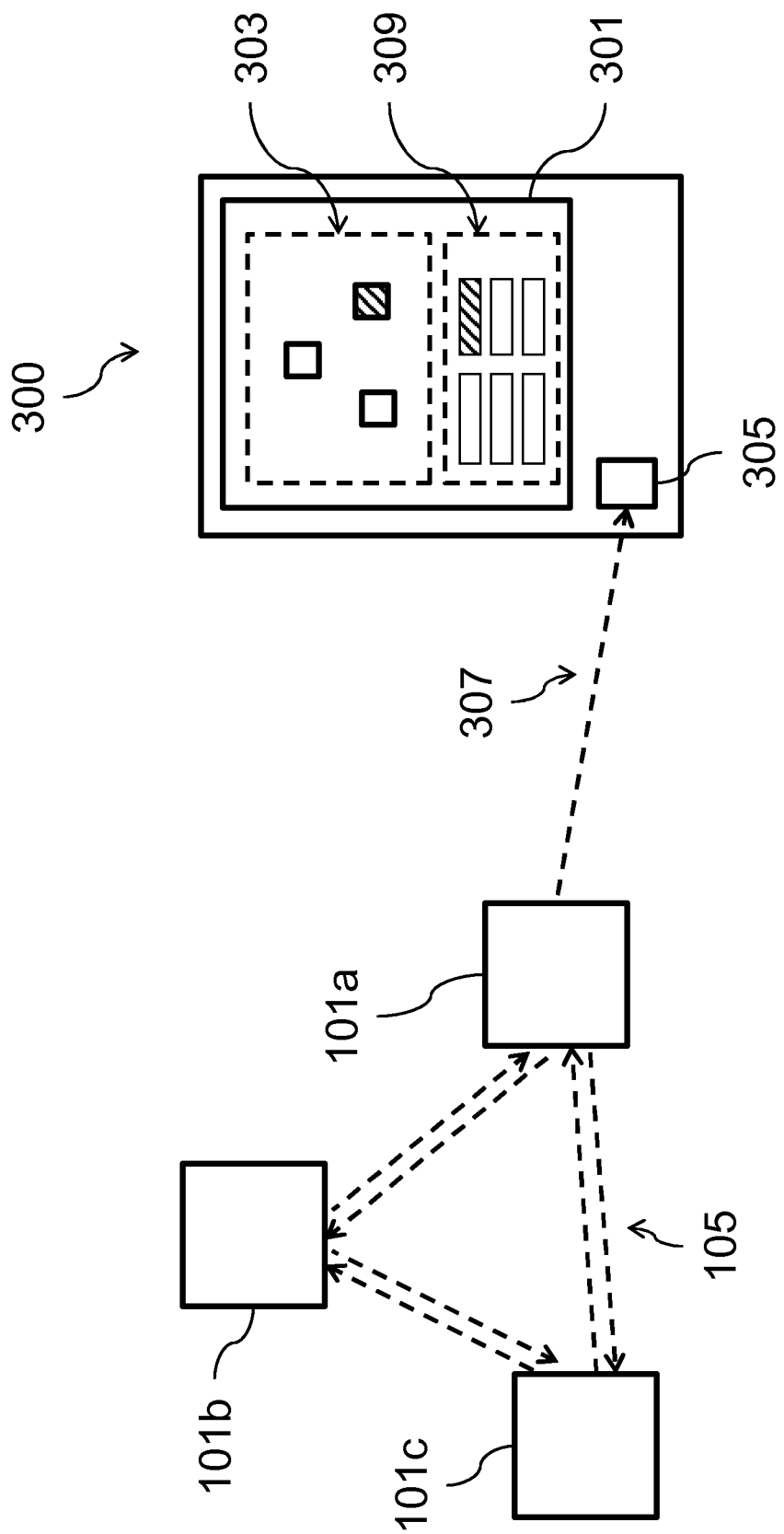
FIG. 3 shows a schematic diagram of a communication device for displaying a state or a change in state of an automation device.

FIG. 3 shows a schematic diagram of a communication device 300 for displaying a state or change in state of the automation device 101a of the group of automation devices 101a-c according to one example.

The communication device 300 can comprise a display 301, in particular a screen, which can be configured to visualize the automation devices 101a-c in the group of automation devices in a digital map 303. The automation devices 101a-c can be visualized in the digital map 303 in the form of a hall plan.

The communication interface 103 of the automation device 101a can be configured to send a device status message to the communication device 300 upon the state or a change in state of the automation device 101a being detected. The communication device 300 can comprise a communication interface 305 which is configured to receive the device status message of the automation device 101a via a further communication network 307.

The display 301 can be configured to highlight, in particular color-based highlight, the state or the change in state of the automation device 101a in the digital map in response to the receiving of the device status message of the automation device 101a.

The display 301 can be further configured to display the automation devices 101a-c of the group of automation devices in a list 309. Furthermore, the display 301 can be configured to indicate states or changes in state of the automation devices 101a-c in the list 309.

The device status message, like the status message, can indicate a state or a change in state of the automation device 101a. The device status message and the status message of an automation device 101a-c can be the same. Furthermore, the device status message can comprise additional information compared to the status message, for example GNSS data of the automation device 101a.

The further communication network 307 can be a wireless or wired communication network. The communication network 105 and the further communication network 307 can be the same.

The communication interface 305 of the communication device 300 can furthermore be configured to receive further device status messages of the further automation devices 101a via the further communication network 307. The display 301 can be configured to highlight the further automation devices 101b-c in the digital map 303 in response to the receiving of the further device status messages of the further automation devices 101b-c.

The communication device 300 can be mobile communications device, in particular a smartphone or a laptop.

LIST OF REFERENCE NUMBERS 101a automation device
101b further automation device
101c further automation device
103 communication interface
105 communication network
107 light source
109 detection device
111 controller
113 service flap
200 method
201 producing
203 receiving
205 emitting
300 communication device
301 display
303 digital map
305 communication interface
307 further communication network
309 list

What is claimed is:

1. A first automation device of a group of automation devices, comprising:
   a communication interface configured to communicate with a second automation device of the group of automation devices via a communication network;
   wherein the communication interface is configured to receive a first status message from the second automation device that indicates a first state or a first change in state of the second automation device; and
   a light source configured to emit a light signal indicating the first state or the first change in state of the second automation device in response to the receiving of the first status message,
   wherein the communication interface is further configured to receive a second status message from the second automation device via the communication network detect a characteristic of the second status message, wherein the second status message indicates a second state or a second change in state of the second automation device, and wherein the characteristic of the second status message indicates a type or a priority of the second state or the second change in state of the second automation device, compare a characteristic of the first status message and the characteristic of the second status message, and detect a ranking of the first status message and the second status message based on the respective characteristics, and
   wherein the light source is configured to emit a second light signal that indicates a respective state or a respective change in state of the second automation device denoted by the first status message and the second status message as being of higher priority.

2. The first automation device according to claim 1, wherein the communication interface or a controller of the first automation device are configured to detect the characteristic of the first status message, the characteristics of the first status message indicating a type or a priority of the first state or the first change in state of the second automation device.

3. The first automation device according to claim 2, wherein the light source is configured to emit the light signal in one light color, brightness, frequency, or some combination thereof, wherein the one light color, brightness, frequency, or some combination thereof of the light signal is associated with the first state of the second automation device, the first change in state of the second automation device, and the characteristic of the first status message.

4. The first automation device according to claim 1, wherein the light source comprises at least one LED.

5. The first automation device according to claim 1, wherein the light source is arranged in an interior space of the first automation device.

6. The first automation device according to claim 1, wherein the communication interface is a wireless communication interface or a wired communication interface.

7. The first automation device according to claim 1, further comprising:
   a detection device, wherein the detection device is configured to detect maintenance to or operation of the first automation device by a user.

8. The first automation device according to claim 7, wherein the light source is configured to display the light signal in response to receiving the first status message when the detection device detects the maintenance to or operation of the first automation device.

9. The first automation device according to claim 7, wherein the communication interface is configured to transmit a third status message to the second automation device when the detection device detects the maintenance to or operation of the first automation device.

10. The first automation device according to claim 1, further comprising:
a controller configured to detect a state or a change in state of the first automation device.

11. The first automation device according to claim 10, wherein the light source is configured to emit a third light signal in response to the detecting of the state or the change in state of the first automation device, wherein the second light signal indicates the state or the change in state of the first automation device.

12. The first automation device according to claim 10, wherein the communication interface is configured to transmit a device status message to a communication device upon the detecting of the state or the change in state of the first automation device.

13. The first automation device according to claim 12, wherein the communication device is mobile and comprises a smartphone or a laptop.

14. A system of automation devices in a group of automation devices, comprising:
a first automation device and a second automation device;
wherein the second automation device is configured to transmit a first status message via a communication network; and
wherein the first automation device is configured to:
receive the first status message from the second automation device,
visually display a first state or a first change in state of the second automation device as indicated by the first status message received,
receive a second status message from the second automation device via the communication network,
detect a characteristic of the second status message, wherein the second status message indicates a second state or a second change in state of the second automation device, and wherein the characteristic of the second status message indicates a type or a priority of the second state or the second change in state of the second automation device,
compare a characteristic of the first status message and the characteristic of the second status message,
detect a ranking of the first status message and the second status message based on the respective characteristics, and
visually display a respective state or a respective change in state of the second automation device denoted by the first status message and the second status message as being of higher priority.

15. A method for indicating states or changes in states of automation devices in a group of automation devices comprising a first automation device and a second automation device, comprising:
transmitting a first status message from the second automation device to the first automation device via a communication network;
receiving the first status message from the second automation device by the first automation device; and
optically displaying a first state or first change in state of the second automation device as indicated by the first status message received by the first automation device,
receiving a second status message from the second automation device via the communication network;
detecting a characteristic of the second status message, wherein the second status message indicates a second state or a second change in state of the second automation device, and wherein the characteristic of the second status message indicates a type or a priority of the second state or the second change in state of the second automation device, and
comparing a characteristic of the first status message and the characteristic of the second status message;
detecting a ranking of the first status message and the second status message based on the respective characteristics, and
optically displaying a respective state or a respective change in state of the second automation device denoted by the first status message and the second status message as being of higher priority.

16. The method according to claim 15, wherein the optically displaying further comprises:
emitting a light signal indicating the first state or the first change in state of the second automation device in response to the receiving of the first status message.

17. The method according to claim 16, wherein the light signal is one light color, brightness, frequency, or some combination thereof, wherein the one light color, brightness, frequency, or some combination thereof of the light signal is associated with the first state of the second automation device, the first change in state of the second automation device, and the characteristic of the first status message.

* * * * *